United States Patent [19]
Bolin et al.

[11] Patent Number: 5,092,449
[45] Date of Patent: Mar. 3, 1992

[54] ARTICLE TRANSFER APPARATUS

[75] Inventors: James A. Bolin; Kevin W. Metcalf, both of Tulsa, Okla.

[73] Assignee: Liberty Glass Co., Sapulpa, Okla.

[21] Appl. No.: 656,860

[22] Filed: Feb. 19, 1991

Related U.S. Application Data

[63] Continuation-in-part of Ser. No. 447,662, Dec. 8, 1989, Pat. No. 5,044,488.

[51] Int. Cl.$^5$ .............................. B65G 25/00
[52] U.S. Cl. ........................ 198/430; 198/740; 65/260; 364/478
[58] Field of Search ............ 198/429, 430, 468.01, 198/740; 65/260, 118; 364/478

[56] References Cited

U.S. PATENT DOCUMENTS

| | | | |
|---|---|---|---|
| 3,960,266 | 6/1976 | Becker | 198/430 |
| 4,081,073 | 3/1978 | Zappia | 198/430 |
| 4,339,028 | 7/1982 | Meacle | 198/427 |
| 4,528,018 | 7/1985 | Schneider et al. | 65/260 |
| 4,660,711 | 4/1987 | Alonso et al. | 198/430 |
| 5,037,466 | 8/1991 | Voisine et al. | 198/468.01 |

FOREIGN PATENT DOCUMENTS 2174667 11/1986 United Kingdom ............ 198/430

OTHER PUBLICATIONS

Title: Electronically Controlled Hydraulically Operate Stackers, Author: Hellok-Automations-Systeme.

Primary Examiner—Joseph E. Valenza
Attorney, Agent, or Firm—Kokjer, Kircher, Bowman & Johnson

[57] ABSTRACT

Apparatus for transferring articles such as glass containers from a first conveyor, on which the containers are traveling generally horizontally in line one after another, on to a second conveyor extending generally at right angles to the first conveyor from one side of the first conveyor. The apparatus is operable in cycles to transfer on each cycle a group of articles from the first to the second conveyor with the articles in the group extending in a row transversely of the second conveyor. The apparatus includes a support, a first carriage on the support movable generally parallel to the second conveyor, a second carriage on the first carriage movable with respect to the first carriage generally parallel to the first conveyor, and a third carriage on the second carriage movable vertically with respect to the first and second carriages. The third carriage carries a pusher bar. The carriages are driven by separate motors under the control of a programmable controller which operates the motors during each cycle of the machine to drive the carriages to cause the pusher bar to transfer a group of articles from the first conveyor on to the second conveyor. A software system allows the desired motion to be plotted along each axis as a motion profile formed as a velocity versus time plot superimposed on the plots for the other axes. Before the motion plots are downloaded for use in operating the stacker, the stacker movements they represent are verified by a pictorial simulation of a stacker bar operating cycle in a video monitor.

11 Claims, 12 Drawing Sheets

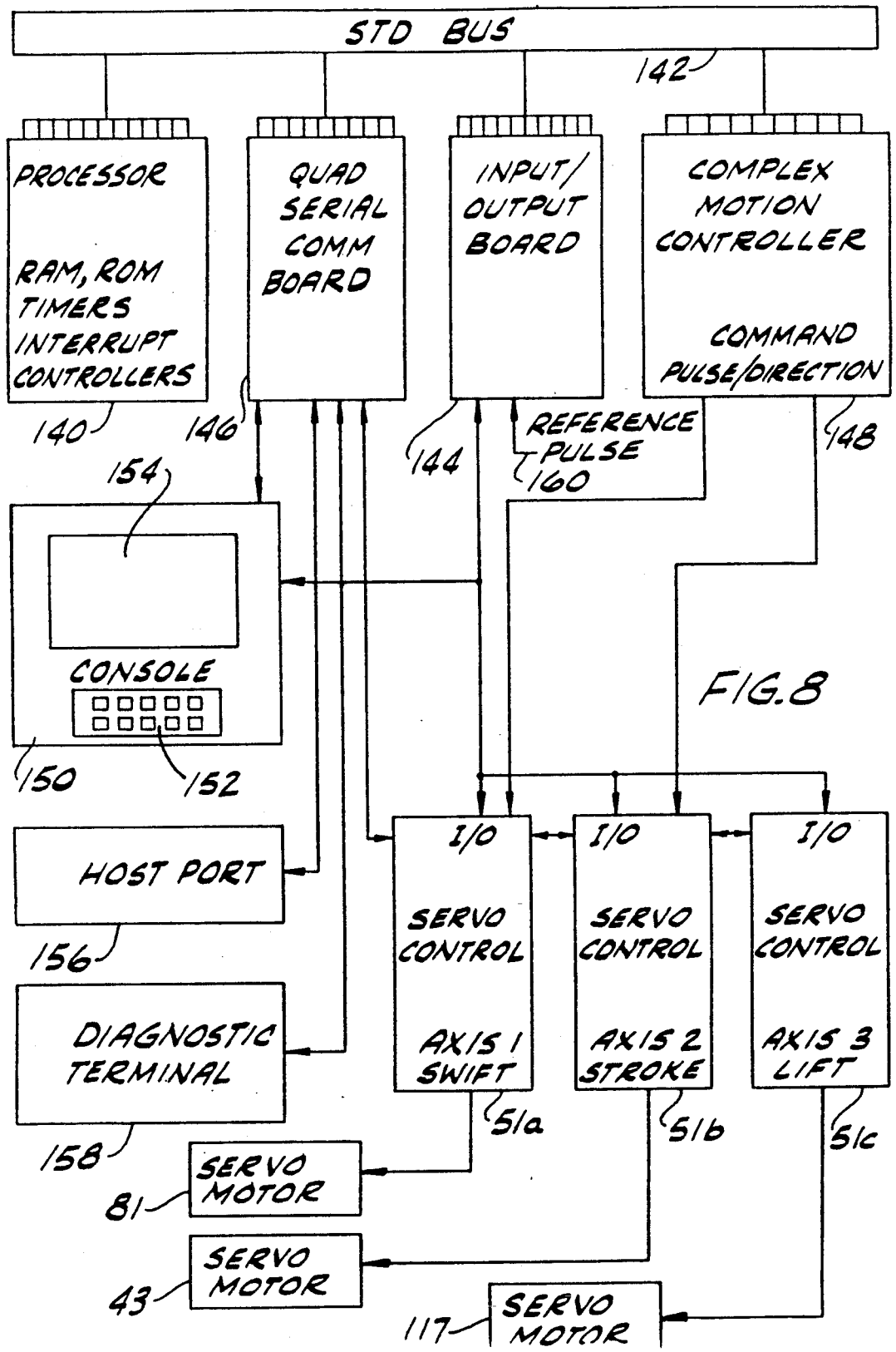

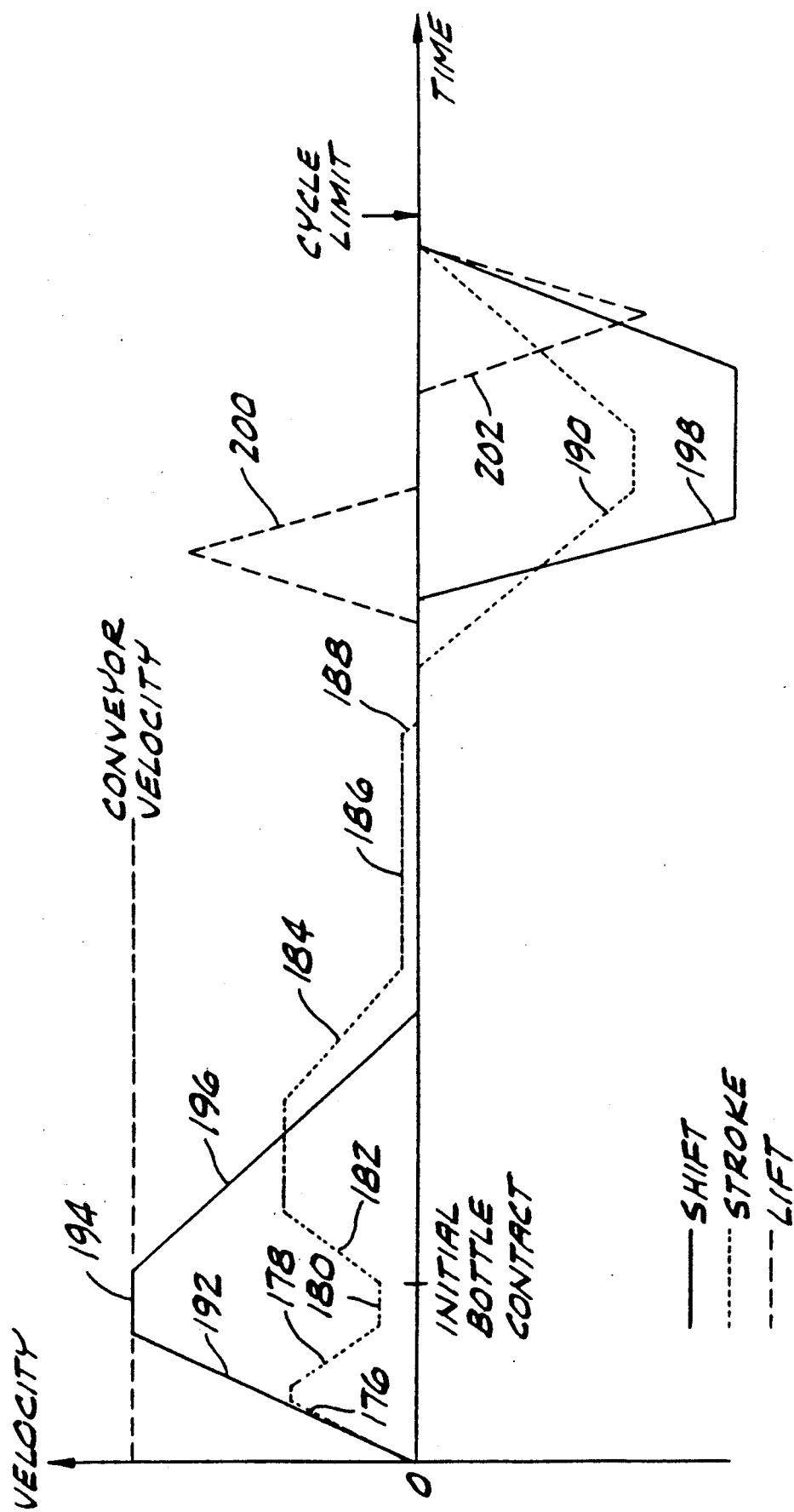

ARTICLE TRANSFER APPARATUS

RELATED APPLICATION

This application is a continuation in part of U.S. application Ser. No. 447,662, filed on Dec. 8, 1989 in the name of James A. Bolin now U.S. Pat. No. 5,044,488.

BACKGROUND OF THE INVENTION

This invention relates generally to apparatus for transferring articles from one location to another and, more particularly, to apparatus for transferring articles from a first conveyor, on which the articles are traveling generally horizontally in line one after another in a first direction, on to a second conveyor extending generally at right angles to the first conveyor, the apparatus being operable in cycles to transfer on each cycle a group of articles from the first to the second conveyor with the articles in the group extending in a row transversely of the second conveyor.

This invention has a particular (albeit not exclusive) application to the glass container industry where apparatus referred to as a "stacker" is used to transfer molded glass containers traveling in line one after another on a first conveyor (sometimes referred to as the "cross conveyor") on to a second conveyor (sometimes referred to as the "lehr conveyor") for conveyance of the containers to a lehr or oven. This transfer takes place shortly after the molding step and while the glass containers are still very hot and thus easily damaged, so that any contact between containers, either as they are moved off the cross conveyor or after they are placed on the lehr conveyor, may damage the containers and render them unusable. It is important, therefore, that the containers be transferred in such a way that contact between the containers is avoided altogether or at least minimized. Prior stacker mechanisms have not accomplished this objective. Moreover, the movement of such prior mechanisms has been controlled by mechanical components such as cams. As a result, adjustment of the mechanism to accommodate variations in container size, conveyor speed, etc. has been time-consuming and caused excessive amounts of downtime of the entire container forming line. Other prior stackers have involved the use of hydraulic motors and have been limited in their range of motion, making adjustment to handle different situations difficult.

Reference may be made to U.S. Pat. Nos. 4,528,018, 4,339,028, 4,081,073 and 3,960,266 for transfer mechanisms generally in the field of this invention.

SUMMARY OF THE INVENTION

Among the several objects of this invention may be noted the provision of improved transfer apparatus of the "stacker" type useful in the glass container industry for transferring glass containers from the cross conveyor on to the lehr conveyor; the provision of such apparatus which is adapted for smoother transfer of articles off the cross conveyor and on to the lehr conveyor, thereby minimizing contact between the containers delivered to the lehr; the provision of such apparatus which is quickly and readily adjustable to accommodate variations in container size, shape, spacing and speed; and the provision of such apparatus which is fast and reliable in operation.

In general, apparatus of this invention is used for transferring articles such as glass containers from a first conveyor, on which the containers are traveling generally horizontally in line one after another in a first direction on a first horizontal axis, on to a second conveyor extending in a second direction on a second horizontal axis generally at right angles to the first axis from one side of the first conveyor. The apparatus is operable in cycles to transfer on each cycle a group of articles in the group extending in a row transversely of the second conveyor. The apparatus comprises a support positionable at the side of the first conveyor opposite the second conveyor, and first, second and third carriages. The first carriage is mounted on the support for reciprocation relative to the support on or generally parallel to said second axis between a retracted position away from the first conveyor and an advanced position toward the first conveyor. The second carriage is mounted on the first carriage for reciprocation with the first carriage on or generally parallel to said second axis and for reciprocation relative to the first carriage on or generally parallel to said first axis between a trailing position and a leading position relative to the line of articles on the first conveyor. The third carriage is mounted for reciprocation with the second carriage and therefore with the first carriage on or generally parallel to said second axis and for vertical reciprocation relative to the second carriage. Pusher means is carried by the third carriage for pushing a group of articles off the first conveyor on to the second conveyor. The third carriage is vertically reciprocable relative to the second carriage between a lowered position wherein the pusher means is at such an elevation relative to the first conveyor as to be engageable with a group of articles on the first conveyor on movement of the third carriage with the second and first carriages third carriage with the second and first carriages retracted position of the first carriage to its advanced position, and a raised position at an elevation above the top of the articles on the first conveyor. First drive means associated with the support is provided for driving the first carriage between its retracted and advanced positions; second drive means associated with the first carriage is provided for driving the second carriage between its said trailing and leading positions; and third drive means associated with the second carriage is provided for driving the third carriage up and down between its lowered and raised positions. Also provided is means for operating the first, second and third drive means for driving the first carriage from its retracted to tis advanced position, and simultaneously driving the second carriage, with the pusher means down, from its trailing to its leading position for pushing said group of articles off the first conveyor and on to the second conveyor. The pusher means is mounted on the third carriage in such manner as to allow for passage of articles on the first conveyor behind the pusher means when it completes the transfer of said group on to the second conveyor. The operating means then acts in conjunction with the first, second and third drive means to raise the third carriage for raising the pusher means to its raised position to clear articles advancing on the first conveyor, and then to drive the second carriage back to its trailing position, and, after the pusher means has moved back out over articles advancing on the first conveyor, to lower the pusher means, thereby positioning the latter for the start of the next cycle of operation.

The invention is particularly characterized by the provision of a system which allows the user to construct motion profile plots of the pusher means (stacker bar) along all of the three axes on a video monitor screen.

The different moves that combine to form the overall motion plot are constructed one at a time in the case of complex motion. All of the motion profiles are plots of velocity versus time, and the plots are superimposed so that they can be viewed on the screen in the same time frame which corresponds with the actual operation cycle time. The plots can be edited as desired until the user is satisfied with them, and they can then be downloaded and used to control the movement of the stacker bar in conformity with the motions represented by the plots.

In addition, the invention allows the user to view on a video screen a pictorial simulation of an operation cycle of the stacker before the equipment is actually operated. The motion plot data are used together with job parameter data to accurately simulate the stacker bar motions. The simulation visually identifies any problems in the motions and permits them to be corrected before they are carried out on the stacker machine.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views:

FIG. 8 is a block diagram of the control system for the servo motors which control the pusher bar motion in the stacker;

FIG. 13 is a diagrammatic representation of a typical motion plot for the pusher bar, with the plots for the motion along the three axes superimposed.

Corresponding numerals indicate corresponding parts throughout the several views of the drawings.

DETAILED DESCRIPTION OF THE INVENTION

Figure 1:
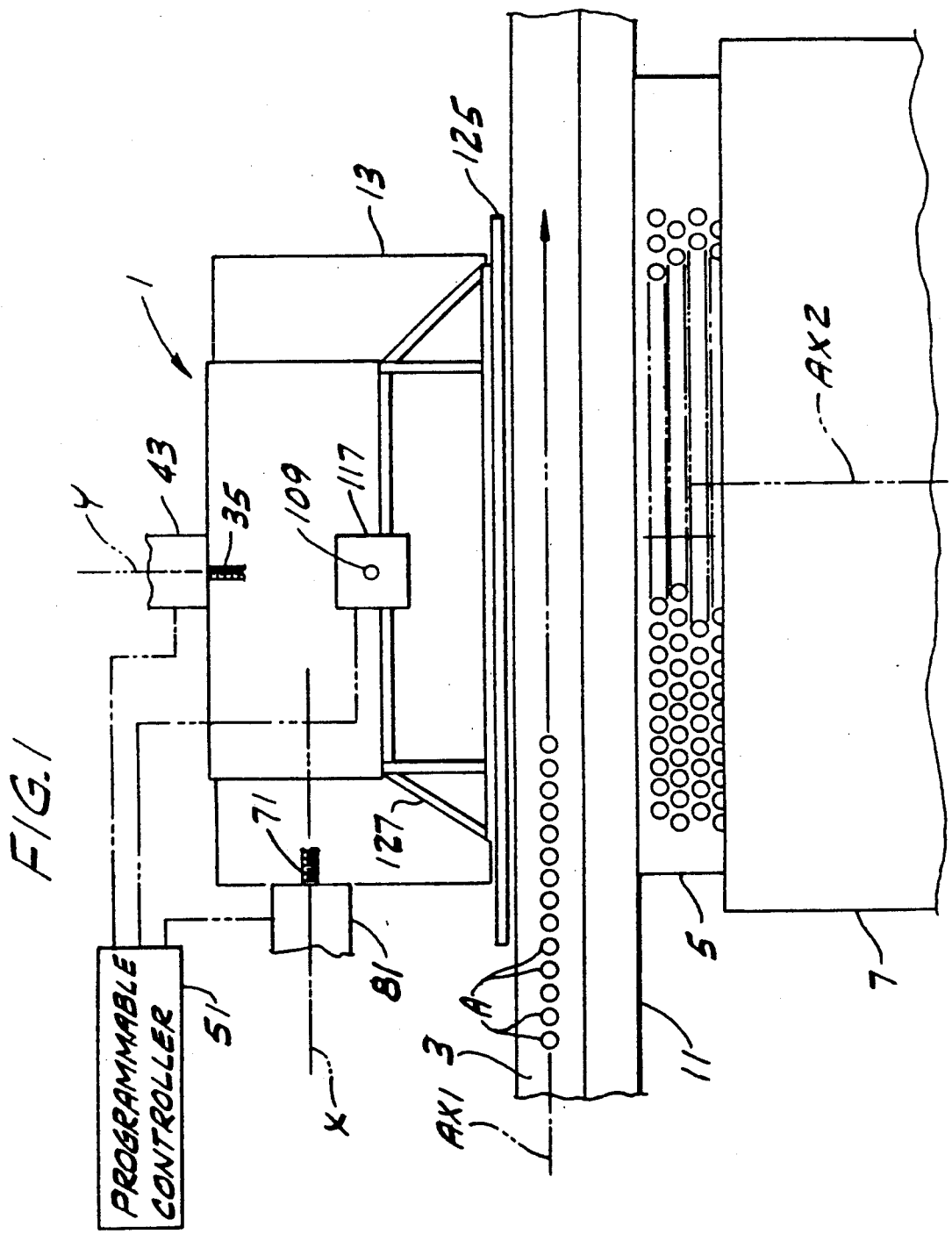
FIG. 1 is a schematic plan view of a stacker of the present invention for transferring containers (e.g., glass bottles) from a cross conveyor on to a lehr conveyor for conveyance to a lehr.

Referring now to the drawings in more detail and initially to FIG. 1, there is generally indicated at 1 apparatus (referred to in the glass container industry as a "stacker") for transferring articles A such as glass containers (e.g., glass bottles) from a first conveyor 3, sometimes referred to as a cross-conveyor, on to a second conveyor 5 for conveyance to a lehr or oven 7, for example. As shown, the articles on the cross conveyor are traveling from right to left generally horizontally in line one after another on a first axis AX1. In the case of glass bottles, the bottles on the cross-conveyor are usually fresh from the mold and still hot and thus readily deformable. The lehr conveyor 7 extends in a second direction on a second horizontal axis AX2 generally at right angles to the first axis AX1 from one side of the cross conveyor 3, a so-called dead plate 11 being interposed between the cross conveyor and the inlet end of the lehr conveyor. As will be discussed in detail hereinbelow, the apparatus of this invention is operable in cycles to transfer on each cycle a group of articles (e.g., 20 articles) from the cross conveyor to the lehr conveyor with the articles in the group extending in a row transversely of the lehr conveyor. Moreover, the apparatus is operable to effect this transfer with little or no contact between the articles, which is very important where hot glass containers are involved to minimize the number of damaged and unusable containers which enter the lehr. It will be understood that while the apparatus of this invention is described herein as a stacker having special application to the glass container industry, the apparatus may have other applications in other industries for transferring various types of articles from one conveyor to another in the manner described.

Figure 2:
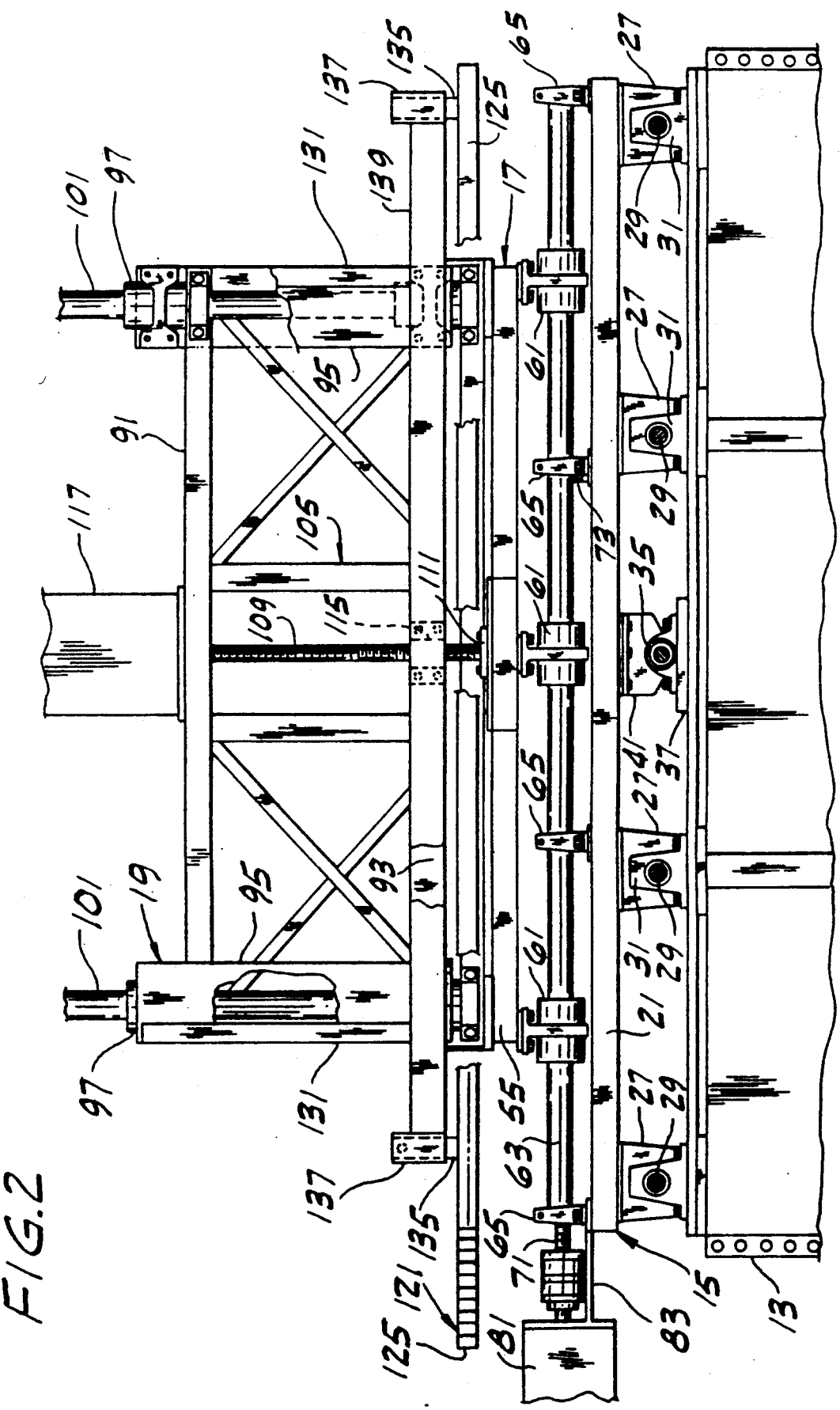
FIG. 2 is a front elevation of the stacker with parts broken away to show details.
Figure 3:
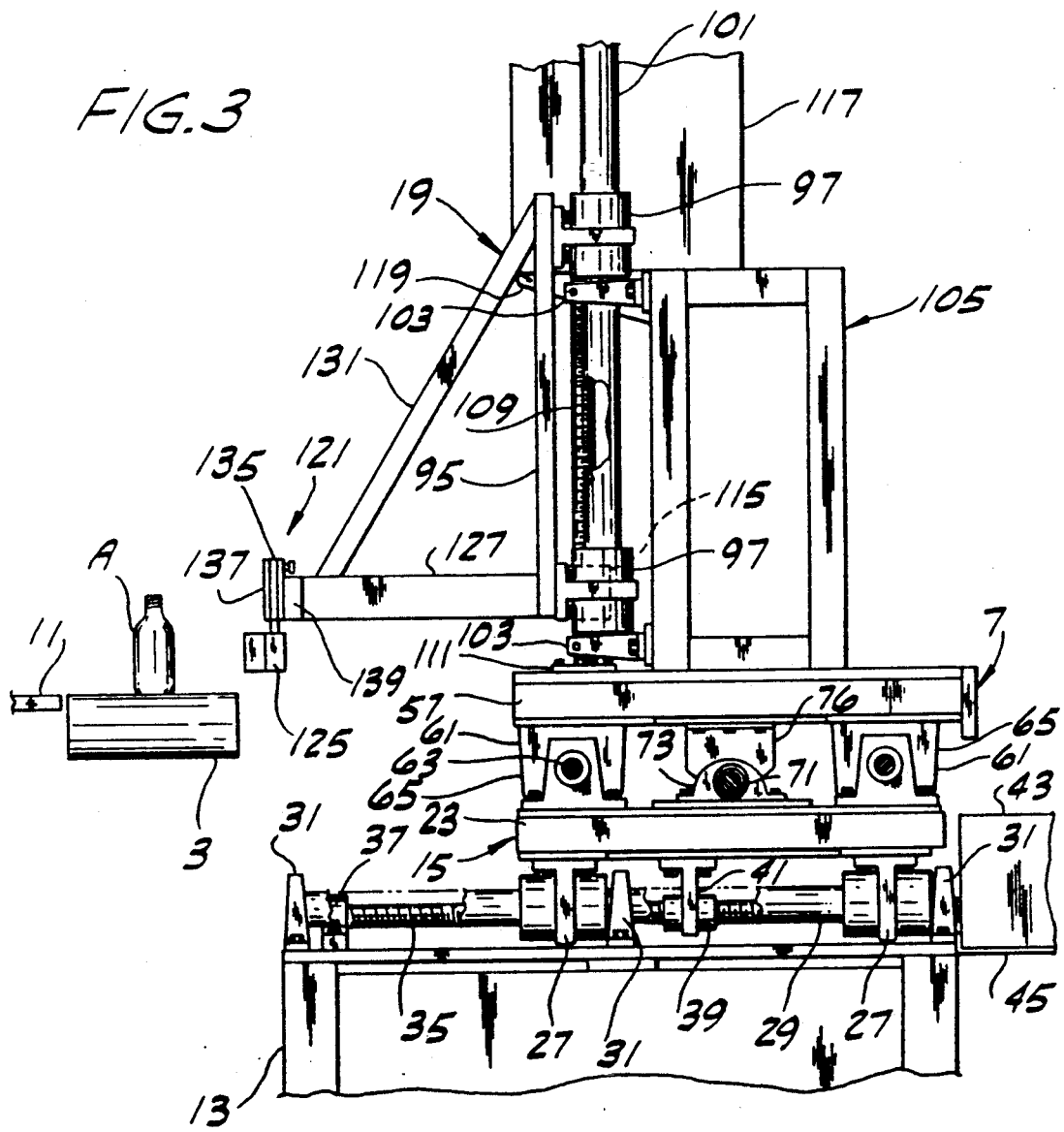
FIG. 3 is a side elevation of the stacker with parts broken away to show details.
Figure 4:
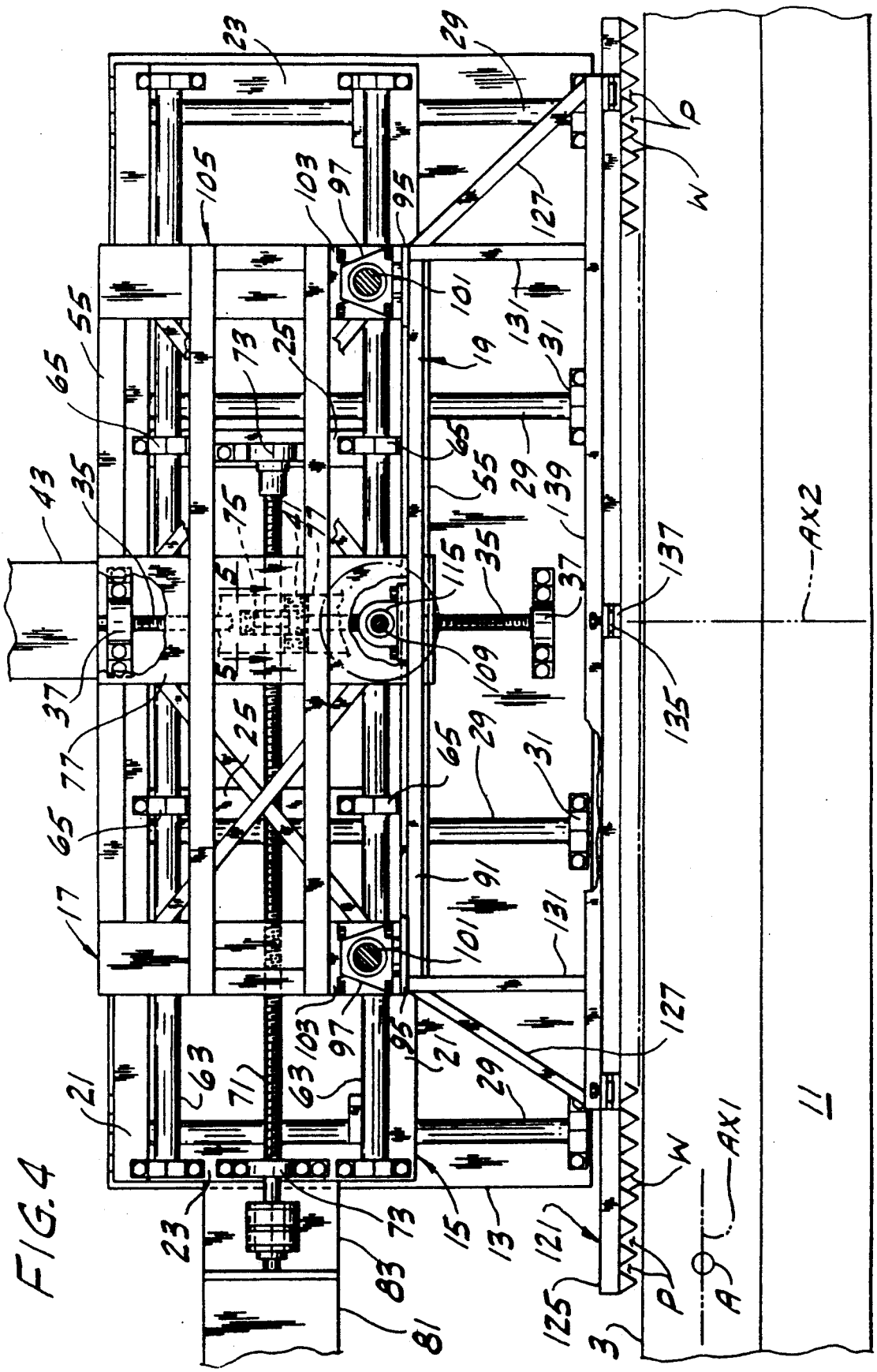
FIG. 4 is a plan view of the stacker with parts broken away to show details.
Figure 5:
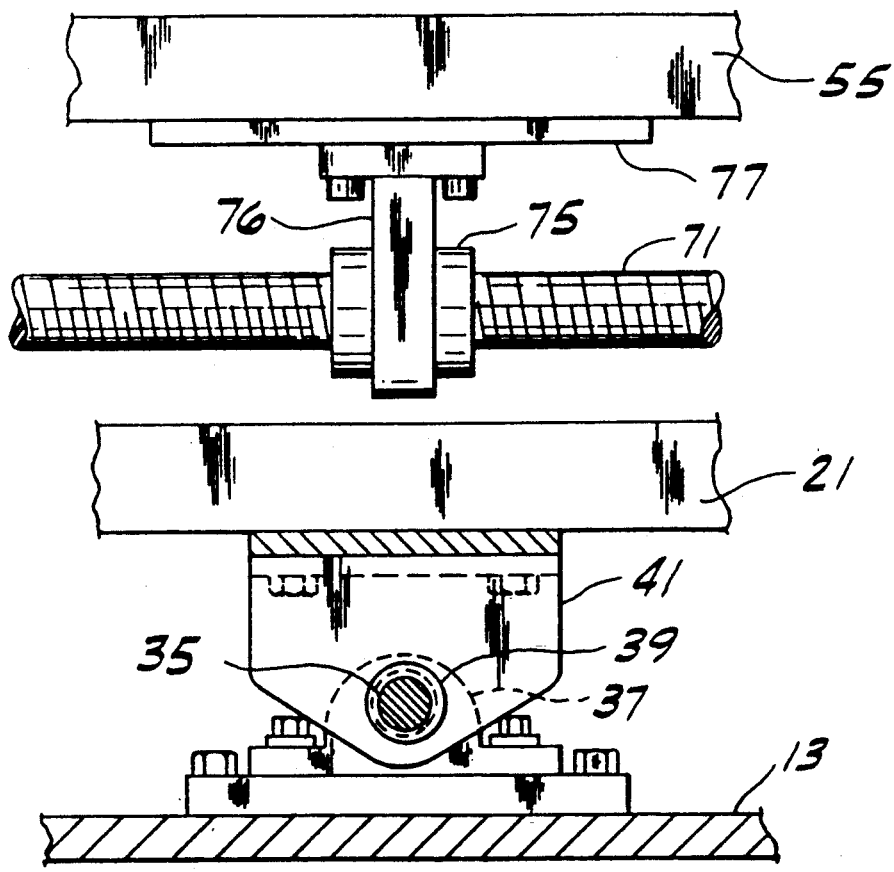
FIG. 5 is an enlarged vertical section taken on 5—5 of FIG. 4.
Figure 7A:
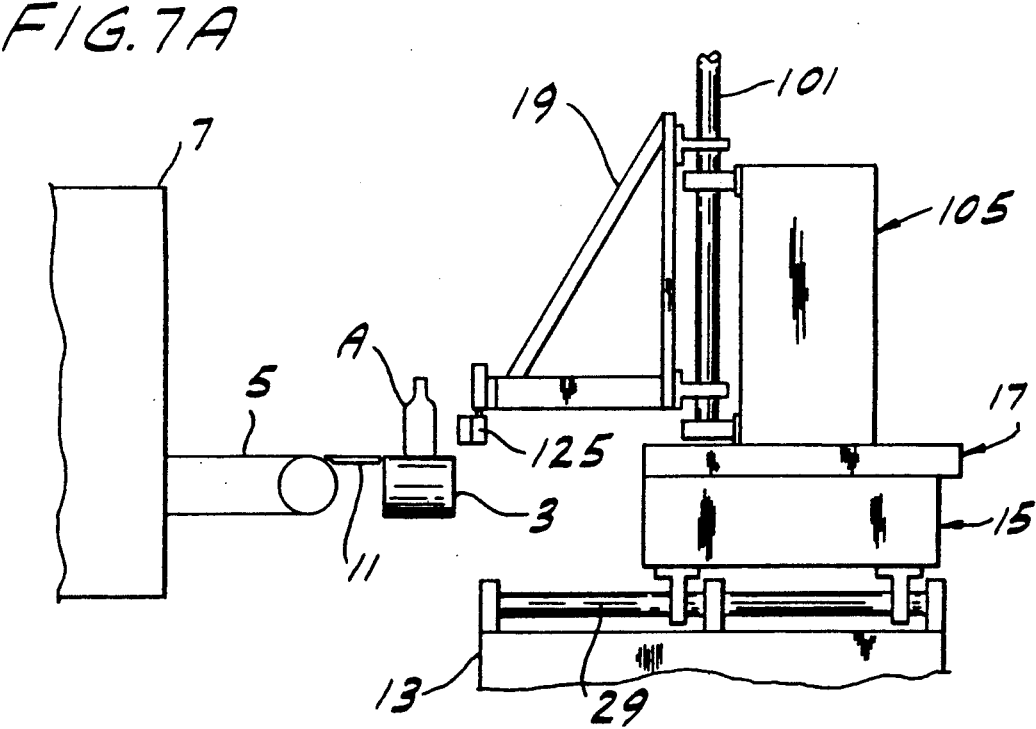
FIGS. 7A-7D are schematic views illustrating the position of the pusher bar relative to bottles on the cross conveyor at various times during a typical cycle of operation.

Referring now to FIGS. 2-4, the stacker apparatus of this invention comprises a support 13 in the form of a table or other suitable framework positioned at the side of the cross conveyor 3 opposite the lehr conveyor 5, and first, second, and third carriages generally designated at 15, 17 and 19, respectively, mounted on the support 13. The first carriage 15 includes a pair of horizontal spaced-apart frame members or rails, each designated 21, extending longitudinally of the carriage generally parallel to axis AX1, a pair of side frame members or rails, each designated 23, connecting the longitudinal rails at opposite sides of the carriage, and a pair of support plates, each designated 25, spanning the longitudinal rails between the side rails. Slide members 27 are affixed to the underside of the carriage and are slidable on a plurality of spaced apart horizontal guide rods 29 (e.g., four rods are shown) rigidly mounted on the table and extending generally parallel to AX2. Each guide rod 29 is supported at its ends and middle by suitable supports indicated at 31 (FIG. 3). Together the slide members 27 and guide rods 29 function as means for mounting the first carriage 15 for reciprocation relative to the table 13 on or generally parallel to axis AX2 between a retracted position (FIG. 7A) away from the cross conveyor 3 and an advanced position (FIG. 7C) toward the cross conveyor. This reciprocation is effected by means of a motor driven ball screw shaft 35 extending generally parallel to axis AX2 and having its ends journaled in bearing blocks 37 mounted on the table 13. The screw shaft 35 is rotatable in a nut 39 secured by means of a bracket 41 in fixed position to the underside of the first carriage 15 (FIG. 3), the arrangement being such that rotation of the screw shaft in one direction causes the carriage 15 to move in one direction relative to the shaft and rotation of the screw shaft in the reverse direction causes the carriage to move in the opposite direction. The screw shaft 35 is rotated by first drive means comprising an electric servo motor 43 (e.g., a stepping motor) mounted on a bracket 45 fastened to the table 13. The motor is under the control of a programmable controller 51, so that rotation of the screw shaft is precisely controlled for effecting precise movement of the carriage along or parallel to axis AX2.

The second carriage 17 includes a pair of horizontal spaced-apart frame members or rails, each designated 55, extending longitudinally of the carriage generally parallel to AX1, and a pair of end frame members or rails, each designated 57, connecting the longitudinal members at opposite ends of the carriage. Slide members 61 are affixed to the underside of the second carriage 17 and are slidable on a plurality of spaced apart horizontal guide rods 63 (two guide rods are shown) extending generally parallel to AX1. The guide rods are supported at spaced intervals along their lengths by suitable supports, each designated 65, affixed to the first carriage (FIG. 2). Together these slide members 61 and guide rods 63 function as means for mounting the second carriage 17 for reciprocation with the first carriage 15 on or generally parallel to the second axis AX2 and for reciprocation relative to the first carriage on or generally parallel to axis AX1 between a trailing position and a leading position relative to the line of articles on the cross conveyor 3. This latter reciprocation of the second carriage 17 relative to the first carriage 15 is effected by means of a ball screw shaft 71 extending generally parallel to axis AX1 and having its ends journalled in bearing blocks 73 mounted on the first carriage. The shaft is rotatable in a nut 75 secured by means of a bracket 76 in fixed position to the underside of a plate 77 spanning the longitudinal rails 55 of the second carriage, the arrangement being such that rotation of the screw shaft 71 in one direction causes the second carriage 17 to move in one direction relative to the shaft and rotation of the screw shaft in the opposite direction causes the carriage to move in the reverse direction. The screw shaft is rotated by second drive means comprising an electric servo motor 81 mounted on a bracket 83 fastened to second carriage 17. The motor 81 is similar to the motor 43 previously described and is under the control of the aforementioned programmable controller 51, rotation of the screw shaft 71 thus being precisely controlled for effecting precise movement of the carriage along or parallel to the axis AX1.

The third carriage 19 includes upper and lower generally horizontal rails, designated 91 and 93, respectively (FIG. 2), interconnected by a pair of vertical frame members 95 at the sides of the carriage, which lies in a vertical plane generally parallel to AX1. A pair of slide members 97 are affixed to each vertical frame member 95 (FIG. 3) and are slidable on a plurality of spaced apart vertical guide rods 101 (e.g., two guide rods) mounted on the second carriage 17. The guide rods 101 are supported at spaced intervals along their lengths by suitable supports, each designated 103, affixed to a framework, generally indicated at 105, rigidly fastened to the second carriage 17. The slide members 97 and guide rods 101 (and associated framework 105) function as means for mounting the third carriage 19 for reciprocation with the second carriage 17 and therefore with the first carriage 15 on or generally parallel to the second axis AX 2 and for vertical reciprocation relative to the second carriage. This vertical reciprocation of the third carriage relative to the second carriage is effected by means of a motor driven ball screw shaft 109 extending generally vertically and having its lower end journalled in a bearing 111 mounted on the second carriage and its upper end journalled in a bearing (not shown) mounted on the framework 105 supporting the guide rods 101. The screw shaft 109 is rotatable in a nut 115 secured in fixed position to the lower horizontal rail 93 of the third carriage 19, the arrangement being such that rotation of the screw shaft in one direction causes the third carriage to move up and rotation of the screw haft in the reverse direction causes the carriage to move down. The screw shaft 109 is rotated by means of an electro servo motor 117 mounted on a bracket 119 fastened to framework 105 for the vertical guide rods. The motor 117 is similar to the motors previously described and is under the control of the aforementioned programmable controller 51, rotation of the screw shaft 109 thus being precisely controlled for effecting precise vertical movement of the carriage.

Indicated generally at 121 is pusher means carried by the third carriage for pushing a group of articles off the cross conveyor on to the lehr conveyor. More specifically, pusher means 121 comprises a horizontal pusher bar 125 carried by a pair of horizontal arms 127 extending obliquely from the lower horizontal rail 93 of the third carriage (see FIG. 4). Suitable bracing 131 extends between the upper rail 91 and the outer ends of the arms 127 to provide the necessary strength. The pusher bar 125 extends generally parallel to the cross conveyor 3 (i.e., generally parallel to axis AX1) and has means thereon forming a series of pockets P (FIG. 4) spaced at intervals along the bar, each pocket being adapted to receive one article, and with the spacing between the pockets being selected according to the desired spacing between the articles when they are transferred on to the lehr conveyor. Each pocket P is defined (at least in part) by opposing diverging side walls, each designated W, which form a relatively wide mouth to facilitate entry of a respective article into the pocket. The diverging walls also function as means for guiding the article to a precise position in the pocket (a fully seated position). The V-shape of the pockets also serves to accommodate variances in spacing between the articles on the cross conveyor. The precise size, shape and spacing of the pockets P will depend on the size, shape and spacing of the articles being transferred.

The pusher bar is held in position by means of slide bars 135 slidable vertically in holders 137 attached to a horizontal beam 139 carried by the arms 127 on the third carriage. The slide bars 135 are releasably secured in position by set screws or other suitable means, the elevation of the pusher bar 125 thus being adjustable according to the height of the article being transferred. This arrangement also permits one pusher bar to be removed from the third carriage 19 and replaced by a different pusher bar configured to handle different articles, or article spacing, etc.

It will be noted that the trailing end portion of the pusher bar (the left end portion as viewed in FIG. 4) extends endwise a substantial distance beyond the trailing end of beam 139. The reason for this is to permit incoming articles A on the cross conveyor 3 to pass behind the pusher bar 125 without interference from the pusher bar framework when the pusher bar is transferring a leading group of articles on to the lehr conveyor 5, as will become apparent.

As the third carriage 19 reciprocates vertically, the pusher bar 125 is movable with the third carriage between a lowered position (FIG. 7A) wherein the pusher bar is at such an elevation relative to the cross conveyor 3 as to be engageable with the leading group of articles on the cross conveyor on movement of the third carriage with the second and first carriages from the retracted position of the first carriage 15 to its advanced position, and a raised position (FIG. 7D) at an elevation above the top of the articles on the cross conveyor.

As noted, operation of the servo motors 43, 81, 117 for driving the carriages 15, 17 and 19, respectively, is under the control of the controller 51, which is programmable for operating the motors to drive the carriages in such a manner as to effect the transfer of a group of articles from the cross conveyor on to the lehr conveyor. Generally, the controller operates motors 43 and 81 for driving the first carriage 15 from its retracted position to its advanced position, and for simultaneously driving the second carriage 17, with the pusher bar 125 down, from its trailing position to its leading position for pushing a leading group of articles off the cross conveyor. As noted above, the pusher bar is mounted in such a manner as to allow for passage of incoming articles on the cross conveyor behind the pusher bar when it completes the transfer of the group of articles on to the lehr conveyor. After the transfer has been completed, the controller acts to operate the motors 43, 81, 117 to raise the third carriage 19 for raising the pusher bar 125 to its raised position to clear the articles advancing on the cross conveyor 3, and then to drive the second carriage 17 back to its trailing position and the first carriage 15 back to its retracted position, and, after the pusher bar has moved back out over the articles advancing on the cross conveyor, to lower the pusher bar, thereby positioning the pusher bar for the start of the next cycle of operation.

Figure 6:
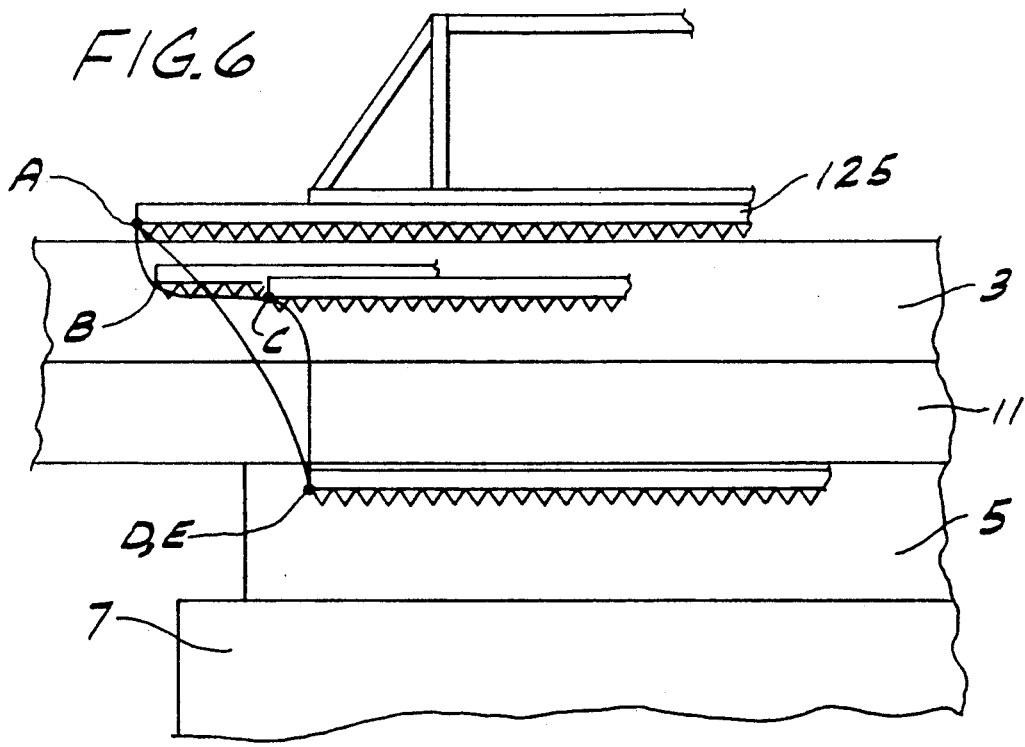
FIG. 6 is a schematic illustrating the movement of a pusher bar of the stacker in a typical cycle of operation.
Figure 7B:
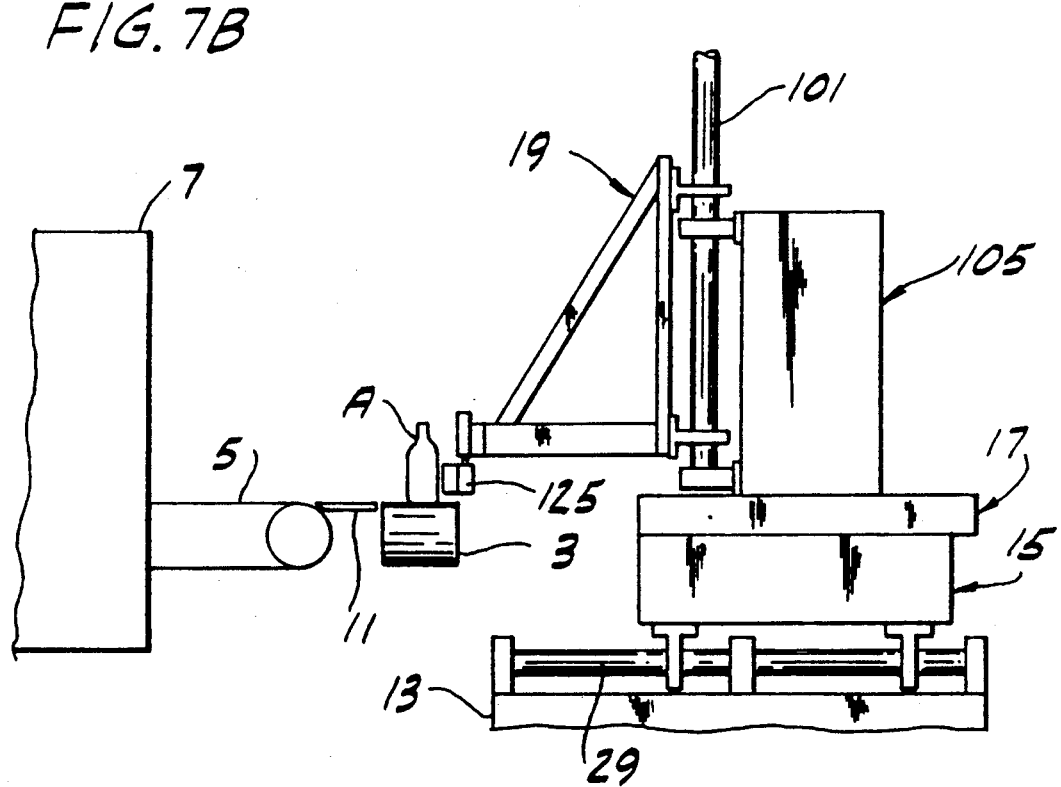
Figure 7C:
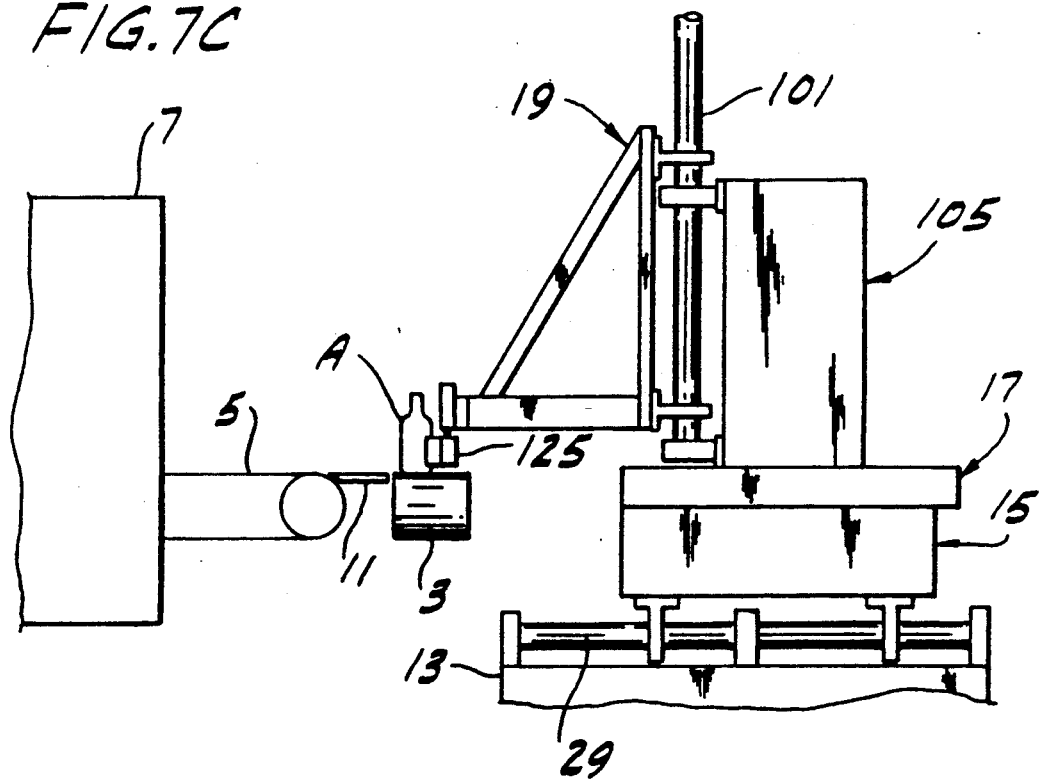
Figure 7D:
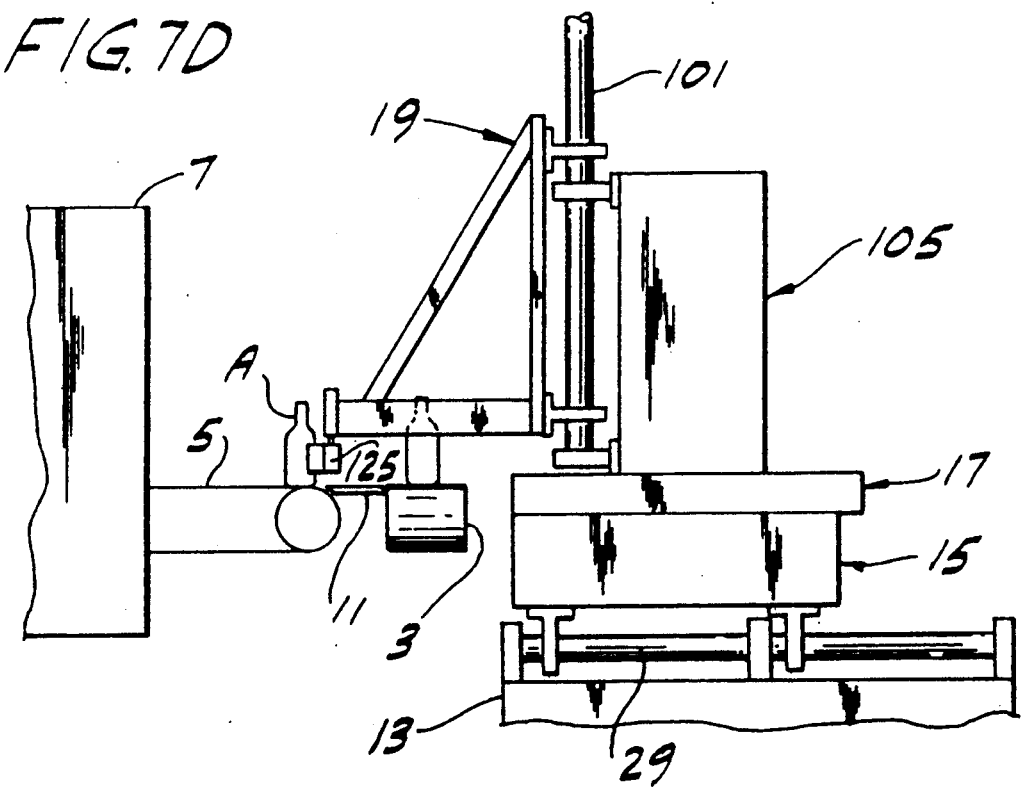
Figure 7E:
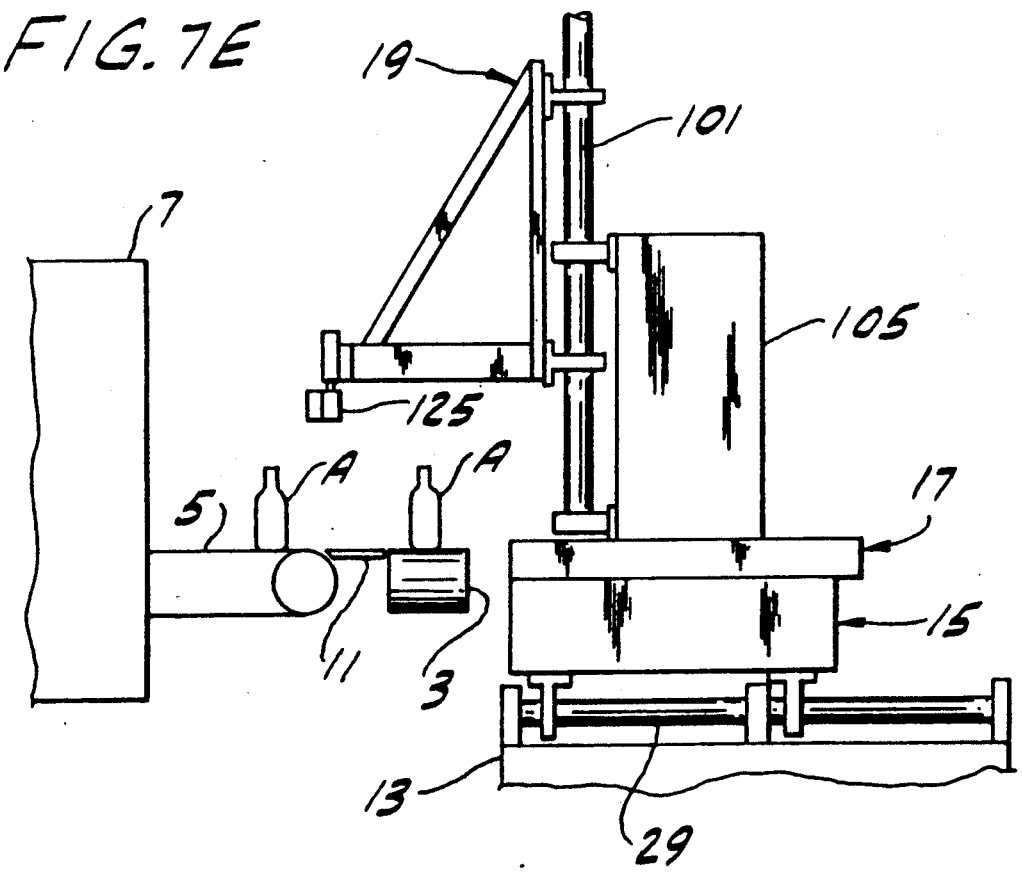

A cycle of operation of the apparatus may best be described with reference to FIGS. 6 and 7A–7E. FIG. 6 shows the path (as viewed from above the stacker) traced by a point on the pusher bar 125 during a typical cycle of machine operation, although it will be understood that the controller 51 may be programmed to vary this path according to the size and shape of the articles being transferred, the speed and width of the first conveyor, the width of the dead plate, the configuration of the rows of articles transferred to the lehr conveyor, and other factors. At the start of a cycle, the pusher bar 125 is in position "A" (FIG. 7A), the first carriage 15 is in its retracted position, the second carriage 17 is in its trailing position, an the third carriage 19 is in its lowered position. The controller 51 then operates motor 43 to drive the first carriage toward its advanced position on or generally parallel to axis AX2. Before the pusher bar reaches its advanced position, and before it engages articles on the cross conveyor 3 (position "B"; FIG. 7B), the controller simultaneously operates motor 81 to drive the second carriage on or generally parallel to axis AX1 to move the pusher bar 125 from its trailing position to its leading position in which the pockets P of the pusher bar are generally aligned with the leading group of articles on the cross conveyor 3. After this general alignment has been attained, the first carriage 15 continues to move towards its advanced position, which causes the pusher bar 125 to move into contact with the leading group of articles to be transferred (position "C"; FIG. 7C), and then to push the articles, with one article in each pocket on the pusher bar, off the cross conveyor 3, over the dead plate 11 and on to the lehr conveyor 5 with the articles in the group extending in a row transversely across the lehr conveyor for conveyance of the lehr conveyor (position "D"; FIG. 7D). As the articles move toward the lehr conveyor, the friction between the bottom of each article and the dead plate will cause the article to move further into its respective pocket P, with the diverging (or converging, depending on the perspective taken) side walls W guiding the article to a fully seated position in which the article is precisely positioned with respect to the other articles being transferred. This ensures that the articles, as delivered to the lehr conveyor, are properly positioned for maximum efficiency and minimum contact between the articles. As the transfer is being completed, incoming articles on the cross conveyor 3 pass behind the trailing end portion of the pusher bar 125. After the transfer has been completed, and before the leading article o the cross conveyor has advanced to a position in which it would strike the supporting framework for the pusher bar, the controller operates the motors 43, 81, 117 to drive the third carriage 19 to raise the pusher bar to an elevation in which it is able to clear the articles advancing on the cross conveyor ("E"; FIG. 7E), and then to drive the second carriage 17 back to its trailing position and the first carriage 15 back to its retracted position. After the pusher bar 125 has moved back over the next group of articles advancing on the cross conveyor, the controller operates motor 117 to lower the third carriage 19 and the pusher bar back to position "A". The stacker is then in position to repeat another cycle for transfer of the next group of articles (now leading) on the cross conveyor on to the lehr conveyor.

To effect a smooth transfer, it is desirable that the speed of the pusher bar 125 along axis AX1 precisely match the speed of the articles traveling on the cross conveyor 3 before the pusher bar makes contact with the leading group of articles. Immediately after the pusher bar has engaged the articles, it is preferred (albeit not essential) that the pusher bar accelerate relative to axis AX! to separate the leading group of articles (now in the pockets P of the pusher bar) from the trailing articles advancing on the cross conveyor. The purpose of achieving this separation is to avoid possible collision between the pusher bar (and/or beam 139) and the incoming articles advancing on the cross conveyor as the pusher bar pushes the leading group of articles off the cross conveyor. The separation also permits the leading articles being transferred to be pushed on to the lehr conveyor at a velocity less than what would be required if there were no separation. Pushing the articles at lower speeds is advantageous in that this provides for a smoother transfer with less risk of articles tipping over as they move on to the lehr conveyor, thereby minimizing the number of damaged articles conveyed to the lehr. It is, of course, necessary that the stroke of the second carriage can be sufficiently long to allow for the slower transfer speed on or generally parallel to axis AX2.

It will be apparent from the foregoing that the transfer apparatus of the present invention can handle a wide range of article sizes, shapes and spacing, cross conveyor speeds and widths, dead plate widths, etc., simply by suitably programming the controller to effect the appropriate movement of the carriages and/or by using a pusher bar with the appropriate pocket size, shape and spacing. Because the movement of the carriages is precisely controlled in terms of both speed and position by the servo motors and ball screw shafts, the transfer of the articles is effected smoothly and efficiently. Adjusting the apparatus to accommodate different situations is also accomplished in less time and with less effort than prior machines (utilizing cams, for example), thereby minimizing the downtime of the stacker for greater line production. For purposes of illustration only, the first carriage 15 may have a maximum stroke of 24 inches, for example, the second carriage 17 a stroke of 36 inches, for example, and the third carriage 13 a stroke of 14 inches, for example. The controller may be programmed to vary the length of the strokes depending on the situation. For example, the stroke of the second carriage 17 may vary between alternate cycles of machine operation to stagger the articles in one row of articles transferred on to the lehr conveyor relative to the articles in the row previously transferred on to the conveyor.

The present invention provides a system for permitting the desired stacker motion to be constructed, plotted as a motion profile curve for each axis, and tested by simulating the operation of the stacker on a video monitor. When the validity of the motions has been verified by the simulation of an operating cycle of the stacker bar, the motions are stored so that they can later be retrieved if the same job is to be repeated.

The control system for the servo motors 43, 81 and 117 of the stacker machine is shown in FIG. 8 in block diagram form. A microprocessor 140 is connected with a bus 142 which also connects with an input/output circuit board 144, a serial communication circuit board 146 and a complex motion controller board 148. The motion controller 148 includes a microprocessor for controlling the complex motions for the stroke and shift axes which are controlled by servo controllers 51A and 51B, respectively. The input/output board 144 connects with these two servo controllers and with a third servo controller 51C which controls the lift axis motor 117. Boards 144 and 146 connect with a console 150 which includes a keyboard 152 for entering input commands and parameters and a video monitor 154 which provides a screen for graphic displays, as will be explained more fully. A host port block 156 and a diagnostic terminal 158 complete the system hardware.

The input/output board 144 provides both pulsed and steady outputs as well as status inputs and EPROM memory for storage of the job currently being run on the stacker. A reference pulse input 160B is delivered to board 144 from the forming machine. Each reference pulse represents an integral number of bottles and is used to calculate the cycle time and to synchronize the cycle start pulse.

The servo controllers 51a, 51b and 51c receive inputs from the communications board 146, the I/0 board 144 and the complex motion controller board 148 (in the case of controllers 51a and 51b) and operate under program control to generate electrical pulses which are applied to the servo motors 43, 81 and 117 to move the stacker bar through an operating cycle that conforms with the motion dictated by motion profiles. The servo controllers provide a fail safe, closed loop system for dependable as well as accurate operation.

The system depicted in block diagram form in FIG. 8 operates in various display modes in which different information is displayed on the monitor 154 and different operations are permitted through entries made on keys that are active on the keyboard 152.

In an idle display mode which is entered automatically from other modes following a timeout period during which there is no operator input, the monitor 154 displays information such as the cycle time and the bottle handling capacity.

A bar alignment mode allows operator adjustment of the cycle timing over a scale of one bottle diameter. The bottle alignment function calculates the time elapsed in moving the cross conveyor a distance equal to the center to center spacing between adjacent bottles, multiplies by the offset setting that is entered and delays the cycle start time by the result to complete synchronization of the bar with the bottles. The alignment setting is entered by striking one of the (0-9) numeric keys on the keyboard 152, with each key representing a percentage of the bottle spacing equal to the numeric value of the key times ten (e.g., the "5" key represents 50%)

Another display mode is the mainline mode which is used to obtain access to the job parameters. In the mainline display mode, menu options are available for display, including one list of options for the motion profile and three lists of options for the respective axes. The motion profile list includes bottle spacing (center to center on the cross conveyor), bottles per pulse and bottles per row (number of bottles per bar load). The axis parameters include for each of the three axes the parameters of distance (maximum position offset), velocity (maximum), acceleration and deceleration (maximums), polarity (left to right or right to left, applicable only to the shift axis), and steps/revolution (number of input pulses that represents one revolution of the motor shaft). Entry of the numerical values for each of these parameters is made in a way that will be explained more fully, and the parameter values are only displayed for verification purposes in the display mode.

In the job identification display mode, the jobs that are contained in the job directory may be shown by job name and the date and time the job was last saved. When a job name is entered, the job directory is searched for a match, and the job is displayed if a match is found.

The job directory includes functions that permit privileged users to change and/or edit the job entries. From the job directory, a job file can be loaded for execution and it can be stored, updated or deleted. Up to eight jobs can be stored in non-volatile memory, and they can be downloaded one at a time or by loading of the complete directory.

The current job file or the job file currently being run may be copied and stored in the job directory in protected memory. The current job which is entered replaces a previously entered job of the same name. If the job is new and not previously present in the directory, it will be added to the directory if storage capacity is present. If not, a message to that effect is given and the user must either delete a job from the directory or abort the attempt to add the current job. All jobs in the directory may be erased by privileged users, and a warning prompt requiring confirmation is issued to prevent inadvertent erasure of the directory.

Various levels of access are preferably provided, and a valid password entry must be made to enable the user to perform functions at the higher levels. Various warnings and error messages are issued under appropriate conditions.

The present invention provides software for constructing the stacker bar motion along each of the three axes, displaying motion plots of the moves along the axes, and display a simulation of the stacker bar moving in the programmed manner during an operating cycle of the stacker. The motions can be adjusted and edited as desired and may be downloaded and stored in nonvolatile memory as a job file.

The software which performs these functions operates in three primary display modes which provide visual displays on the video monitor 154 and which may use the keys on the keyboard 152 for performing various functions. The three primary display modes are the mainline mode, the motion edit mode, and the stacker simulator mode.

Figure 9:
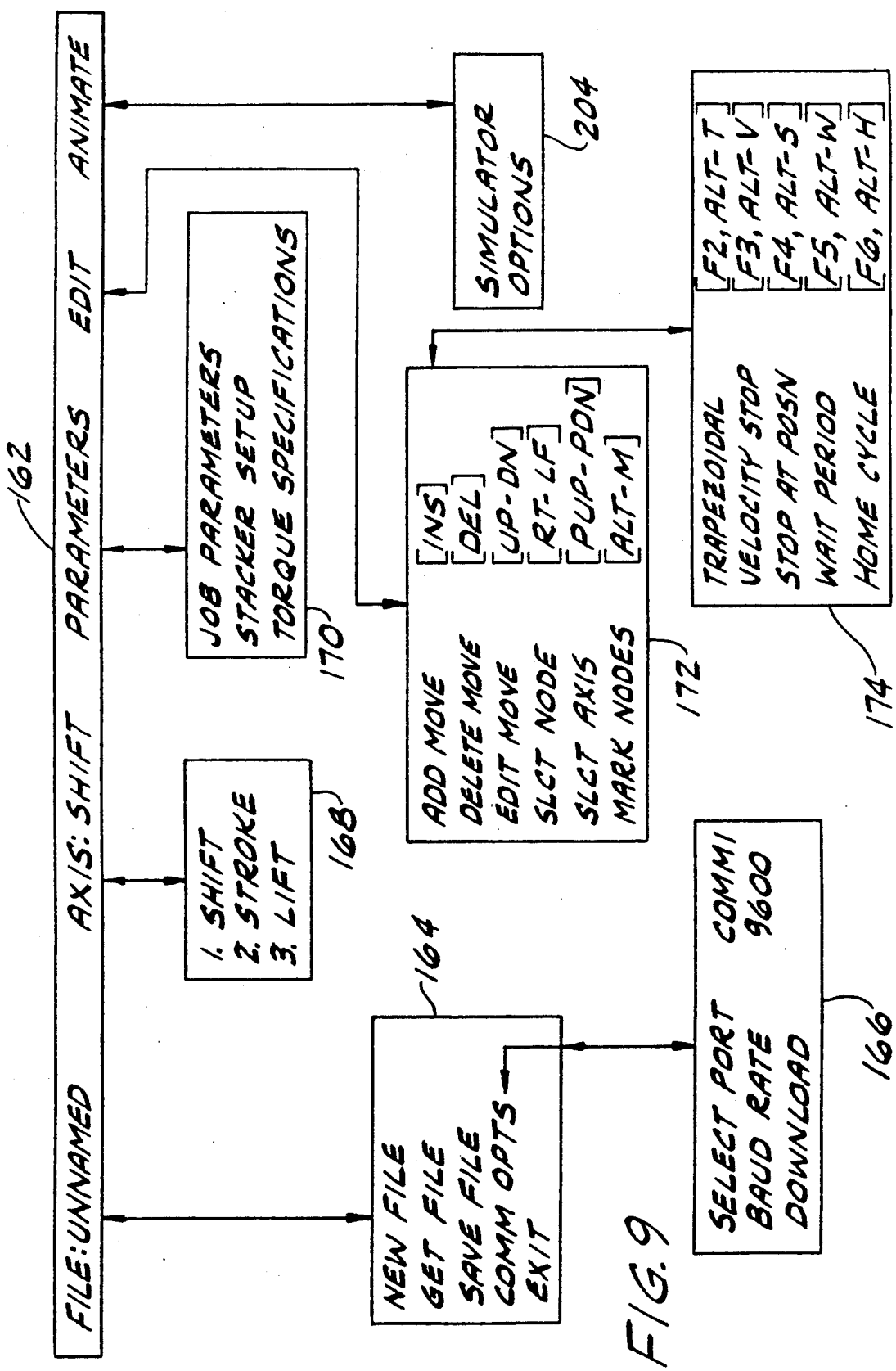
FIG. 9 is a diagrammatic view of the main menu selections available in the software which is used to construct and edit motion plots for the pusher bar and to graphically simulate the bar motions on a video screen.

In the mainline mode, the monitor screen 154 displays across its top a bar menu 162 which is depicted in FIG. 9. The bar menu 162 includes five different options which each have sub-options. The five main options are "file", "axis", "parameters", "edit" and "animate".

The "file" option allows job files to be stored and retrieved. When the "file" entry is selected from the menu, a pull-down window 164 appears on the screen and includes five sub-options. The "new file" option is selected if a new job is being created. The "get file" option is used to retrieve an existing job file which should be entered by job name. If a match to the job name is found in the directory, the job file is loaded into the program memory and the job move profile is displayed on the monitor 154. The "save file" option is used to record the job file on a magnetic medium such as a disk.

The "comm opts" (communications options) selection allows the job file to be downloaded. Its selection causes a pop-up window 166 to be displayed on screen 154. One of the options on window 166 is a download selection which initiates downloading of the job file. When downloading has been completed, a "file transferred" message is displayed on the screen.

The second option displayed on the menu bar 162 is the "axis" option. When it is selected, a pull down window 168 is displayed on the screen and allows selection of which of the three axes is active. Axis number 1 is assigned to the shift axis which is the axis parallel to the cross conveyor. Axis number 2 is the stroke axis which is oriented parallel to the direction of motion of the lehr conveyor. Axis number 3 is the lift axis which is vertical for lifting the stacker bar over the containers during the return stroke of the bar. The axes are selected during construction and editing of the motion profiles.

The third option on the menu bar 162 is a "parameters" option which allows the entry of data pertinent to the job and the stacker specifications. When this option is selected, a pull down window 170 is displayed on the screen to indicate that data are needed in the areas of job parameters, stacker setup and torque specifications.

When the job parameters selection is made, another window is displayed to allow entry of input parameters that determine factors such as conveyor speed, axis velocities and cycle time. Among the parameters that are entered are bottle spacing (center to center distance between adjacent bottles on the cross conveyor), bottles per pulse (number of bottles represented by each reference pulse 160), bottles per row (number of bottles pushed onto the lehr conveyor per cycle), production rate (intended number of bottles to be handled per minute), maximum shift (allowed travel along the shift axis), maximum stroke (allowed travel along the stroke axis), maximum lift (allowed travel along the lift axis), and shift direction (right to left or left to right as viewed from behind the stacker).

Figure 12:
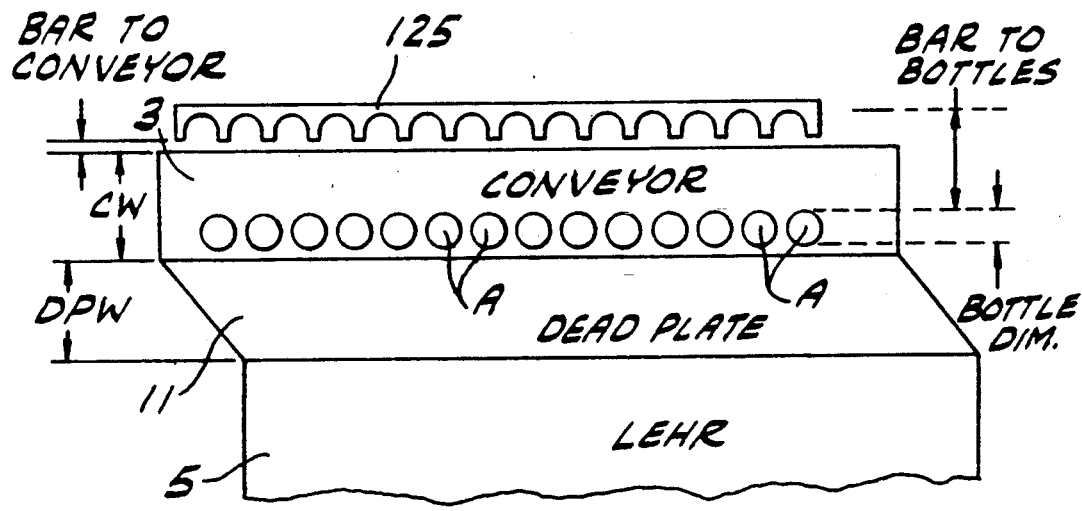
FIG. 12 is a diagrammatic plan view of the stacker at the start of an operating cycle.

The stacker setup parameters are the dimensions of the stacker that are used to create an accurate graphic depiction of the stacker on the screen 154 for use in simulating the stacker movement. As best shown in FIG. 12, these stacker specifications are the conveyor width CW, the dead plate width DPW, the "bar to conveyor" dimension, the "bar to bottles" dimension, and the bottle diameter.

The final data entry on window 170 is the torque specifications entry, and it is used to enter torque parameter data so that the torque on each axis can be approximated and displayed during the simulation each time the acceleration changes. The approximation of the torques relies on assumptions as to frictional forces and rotational inertia factors, and the torque values that are displayed are valuable in predicting load problems and in sizing the motors.

Figure 10:
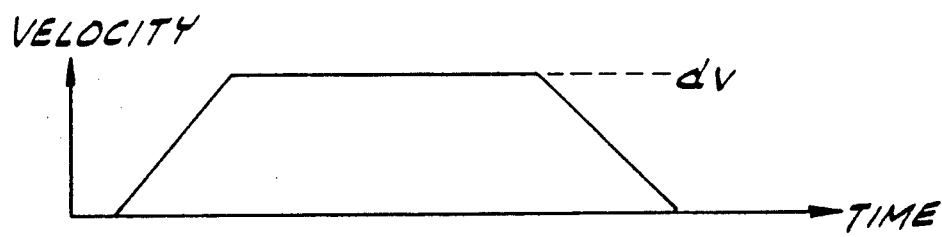
FIG. 10 is a diagrammatic representation of a simple trapezoidal motion plot.

The edit option on the menu bar 162 provides the bulk of the software and is used to construct and adjust the desired stacker bar motion profiles along the three axes. FIG. 10 is a motion plot for simple motion in which time is represented by the horizontal axis and velocity by the vertical axis. The motion represented by the plot of FIG. 10 is simple trapezoidal motion in which the acceleration is constant up to a constant dwell velocity dv which is maintained prior to a final constant deceleration to zero velocity. It is noted that the acceleration is determined by the slope of the velocity plot and that the distance covered between any two times is determined by the area bounded by the plot for the time interval involved.

Figure 11:
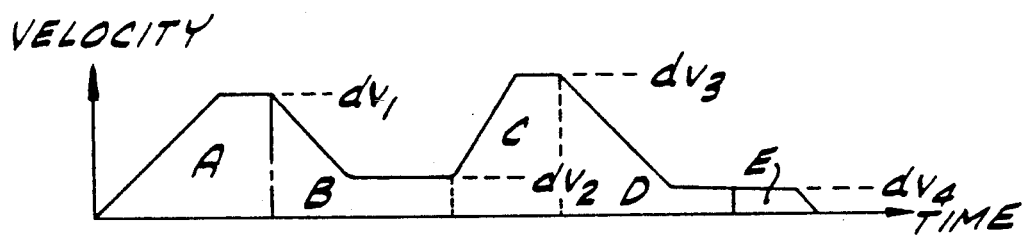
FIG. 11 is a diagrammatic representation of a complex motion plot which can be formed by combining a series of motions.

FIG. 11 depicts a motion plot for a complex motion in which there is an acceleration to a first dwell velocity dV, which is maintained for a time, followed by a deceleration to another dwell velocity $dV_2$, followed by acceleration to a third dwell velocity $dV_3$, followed by deceleration to a fourth dwell velocity $dV_4$, followed by deceleration to rest. This type of complex motion can be broken up into a number of successive moves, each having a dwell velocity, an acceleration (or deceleration) and a travel distance. The first four moves A-D shown in FIG. 11 can be characterized as velocity step moves because they involve accelerating or decelerating to a dwell velocity and maintaining the dwell velocity to the end of the move. The final move E can be characterized as a stop at position move in that it involves stopping at a particular position.

When the edit mode is entered, a window 172 is displayed containing "add move", "delete move", "edit move", "select node", "select axis" and "mark nodes" options. When the "add move" option is selected, another window 174 is displayed to indicate the types of moves that are available to be added to the selected node. The "delete move" option is used to delete the active move from the motion profile. The "edit move" allows the current values of the move data to be changed and the motion profile to be displayed with the changes. In the "select node" option, the nodes (points where the acceleration changes) are selected to allow each node to be made active for editing, adding or deleting a move. The "select axis" option provides one of the several ways to select which axis is active. The "mark nodes" option permits selection of an interval covering two or more nodes so that groups of moves can be deleted, compressed or expanded (in time or distance).

The display window 174 shows the five types of moves that are available. The trapezoidal move can be selected to carry out a simple move of the type depicted in FIG. 10, and its selection results in a display requesting the displacement (absolute position at the end of the move), the dwell velocity, the acceleration and the deceleration. The velocity step move is the primary move used for complex motion such as the plot shown in FIG. 11. The data required are the final position, the dwell velocity and the acceleration. Even if the acceleration is in fact negative (deceleration), a positive acceleration can be entered as the software determines the sign (plus or minus) based on the known start and end velocities. The stop at position move is valid only after a velocity step move and requires only the final position because the deceleration value is set automatically at the value for the prior velocity step move. If the velocity and acceleration values do not allow the entered position to be reached, an error signal is generated.

The wait period move is not really a move but instead a command to pause before the next move is initiated, usually for the purpose of coordinating the motion among the axes. The only parameter needed is the duration of the wait period. The home moves is actually a special case of the trapezoidal move. The difference is that the displacement is known and the displacement and velocity are negative values because the motion is the return motion which is opposite in direction to the previous motion.

The software includes an "auto ramping" feature that is available for use with the trapezoidal, velocity step and home moves but not with the stop at position move. If the auto ramping feature is used, the acceleration value is automatically selected such that half of the entered displacement will be covered while acceleration to the entered dwell velocity for trapezoidal and home moves. In the case of velocity step moves, all of the distance is covered during acceleration and the dwell time is zero. If the distance and acceleration values are insufficient to allow the entered dwell velocity to be reached for a trapezoidal or home move, a triangular move will be generated with the peak of the triangle at a different velocity than the entered dwell velocity.

FIG. 13 depicts superimposed plots of the motion profiles along all three axes for a representative operating cycle of the stacker. It is noted that it is usually desirable for the motion of the bar along the stroke axis (dotted line motion profile) to be relatively slow at the time the stacker bar initially contacts the bottles in order to allow the bar to gently contact the bottles. However, the stacker bar should then accelerate so that it carries the bottles onto the dead plate without the immediately succeeding bottles on the cross conveyor being obstructed by the stacker bar. These results can be obtained by causing the stacker bar to initially accelerate along the stroke axis at increment 176, dwell for a short time, decelerate at increment 178 to a relatively low speed at the constant velocity increment 180 when the bar meets the containers, and then accelerate again at increment 182 to quickly move the captured bottles off of the cross conveyor and over the dead plate onto the lehr conveyor. AS the stacker bar approaches the end of its forward stroke, it should decelerate at increment 184 to a low velocity 186 which is maintained until the bar decelerates to zero velocity at increment 188. The home cycle for the stacker along the stroke axis is the simple trapezoidal profile 190.

Along the shift axis, the stacker bar should be at the conveyor velocity at the time it initially contacts the containers. Thus, it should initially accelerate along the shift axis at increment 192 until at increment 194 it maintains a constant velocity equal to the cross conveyor velocity as the bottles are captured by the bar from the cross conveyor. The motion along the shift axis can decelerate to zero along increment 196 after the containers have been pushed off of the cross conveyor. The home cycle along the shift axis can be the simple motion represented by the trapezoidal profile 198.

The motion required along the lift axis is simple motion represented by the triangular profile 200 during raising of the stacker bar to allow it to clear the containers on the cross conveyor and by the triangular profile 202 during lowering of the stacker bar after the incoming containers have been cleared.

The motion profiles shown in FIG. 13 can be constructed with the moves described previously, and it is noted that only the motion along the stroke axis is complex in this example. However, other axes can require complex motion depending upon the variables from job to job. The motion profiles are superimposed on the video monitor 154 so that the user can view them essentially as depicted in FIG. 13 to make certain that the motions conform with the job and do not exhibit errors such as failure of completion by the cycle limit time.

It is a particular feature of the invention that the operation of the stacker can be realistically simulated on the video screen 154 to verify that the stacker motions are desirable and will not damage either the containers or the machine. After motion profiles have been constructed and are considered satisfactory, the simulation can be conducted.

The simulation of the stacker movement takes place through the "animate" option on the menu bar 162. When the "animate" option is selected, a graphical representation of the conveyor, bottles, stacker bar, dead plate and lehr conveyor similar to that of FIG. 12 is generated on the video monitor 154. Based on the stacker specifications, job parameters and motion profiles, the pictorial representation on the screen proceeds in selected increments through a complete operating cycle of the stacker to allow the user to visually verify the selected motions and determine if adjustments are necessary. Values for position, velocity, acceleration and torque for all three axes, along with the elapsed time, are displayed for each increment.

By visually simulating the stacker motions on the screen before the stacker actually begins the job, problems that could damage the containers or the stacker equipment are called to the attention of the user and corrections can be made prior to operation of the stacker. Only after a simulation has been carried out successfully to prove the validity of the motion profiles is the job file downloaded for use in operating the stacker. In this way, the motion profiles can be verified without the possibility of damaging equipment.

When the "animate" option is selected, a "simulator options" window 204 (FIG. 9) is displayed on the screen. Among the data that can be entered via the options on window 204 are the time interval selected between successive positions of the stacker shown during simulation, the production rate, and bar alignment. The time interval selection permits the user to balance precision (small increments) and cycle replay speed (larger increments). The production rate selection is independent of the rate entered as a job parameter, and changing the rate allows the user to visualize what changes in acceleration and torque result from changes in the production rate. The bar alignment parameter permits synchronization of the bar motion with the bottles in the simulation.

It is thus evident that the present invention allows the user to select the motions of the stacker bar along all three axes and displays on the video screen the superimposed motion profiles in a form of velocity plotted against time. The data that is representative of the motion plots can be edited as desired and the data representing the final plots are downloaded and used to generate electrical pulses which correspond to the data and which are applied to the servo motors 43, 81 and 117 in a manner to move the stacker bar along each axis according to the corresponding motion plot.

Prior to being downloaded, the data are used to simulate on the screen the motions of the stacker bar that the data represent. Thus, the simulation of the stacker bar movement allows the user to verify the validity of the motions before the servo motors are activated to operate the stacker. Also, before the data are downloaded they are stored on a disk or other magnetic storage medium so that the job file can later be retrieved from the disk and used to run the job.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A method of controlling the operation of a stacker machine which has a stacker bar mounted for movement along a shift axis oriented parallel to a cross conveyor carrying incoming glass containers in a row extending parallel to the shift axis, a stroke axis oriented parallel to a lehr conveyor carrying the containers away from the cross conveyor in a row transverse to the lehr conveyor movement and a vertical lift axis wherein the movement of the bar along each axis is effected by a different motor, said method comprising the steps of:

generating on a video screen superimposed graphic plots representing the selected motions of the stacker bar along all three of said axes during one cycle of the stacker machine, with each plot depicting the velocity of the stacker bar along the corresponding axis at each time during said cycle;

using data representative of said plots to generate electrical pulses corresponding to the plots; and applying said pulses to the motors in a manner to effect movement of said stacker bar along said axes in accordance with the motions represented by said plots.

2. The method of claim 1, including the steps of:
generating on the screen a graphic image of the stacker machine; and using said data to simulate on the screen the selected motions of the stacker bar along said axes to verify the validity of the motions prior to said step of applying said pulses to the motors.

3. The method of claim 1, including the step of storing said data on a magnetic medium from which the data are retrievable to permit future application of said pulses to the motors.

4. The method of claim 1, wherein the step of generating superimposed graphic plots comprises the steps of:
selecting for the plot of the motion along said shift axis a maximum velocity substantially equal to the velocity of the cross conveyor;

selecting for the plot of the motion along said shift axis a desired acceleration from rest to said maximum velocity; and selecting for the plot of the motion along said shift axis a desired deceleration from said maximum velocity to rest.

5. A method of controlling the operation of a stacker machine which has a stacker bar mounted for movement along a shift axis oriented parallel to a cross conveyor carrying incoming glass containers in a row extending parallel to the shift axis, a stroke axis oriented parallel to a lehr conveyor carrying the containers away from the cross conveyor in a row transverse to the lehr conveyor movement and a vertical lift axis wherein the movement of the bar along each axis is effected by a different motor, said method comprising the steps of:

generating on a video screen a graphic image of the stacker machine;

constructing motion plots for the desired motion along each of said axes;

using data representative of said motion plots to simulate on the screen motions of the stacker bar along said axes to verify the validity of the motion plots;

after the validity of the motion plots has been verified, using said data to generate electrical pulses corresponding to the motion plots; and applying said pulses to the motors in a manner to effect movement of said stacker bar along said axes in accordance with the motions represented by said plots.

6. The method of claim 5, including the step of storing said data on a magnetic medium from which the data are retrievable to permit future application of said pulses to the motors.

7. The method of claim 5, wherein the step of constructing motion plots comprises the steps of:
selecting for the plot of the motion along said shift axis a maximum velocity substantially equal to the velocity of the cross conveyor;

selecting for the plot of the motion along said shift axis a desired acceleration from rest to said maximum velocity; and selecting for the plot of the motion along said shift axis a desired deceleration from said maximum velocity to rest.

8. In a stacker machine having a stacker bar supported to move along a shift axis oriented parallel to a cross conveyor carrying incoming glass containers in a row extending parallel to the shift axis, a stroke axis oriented parallel to a lehr conveyor carrying the containers away from the cross conveyor in a row extending transverse to the lehr conveyor movement, and a vertical lift axis, the improvement comprising:

a motor for each of said axes operable to effect movement of the stacker bar along the corresponding axis;

a video screen;

means for constructing and displaying on said video screen superimposed graphic plots representing the motions of said stacker bar along all of said axes during one cycle of the stacker machine, each plot depicting the velocity of the stacker bar along the corresponding axis at each time during said cycle;

means for using data representative of said plots to generate electrical pulses corresponding to the plots; and means for applying said pulses to the motors in a manner to effect movement of the stacker bar in conformity with the motions represented by the plots.

9. The improvement of claim 8, including:

means for displaying on said screen a graphic image of the stacker machine; and means for using said data to simulate on the screen the motions of the stacker bar represented by said plots to verify the validity of the motions before applying said pulses to the motors.

10. The improvement of claim 8, including means for storing said data on a magnetic medium from which the data are retrievable.

11. In a stacker machine having a stacker bar supported to move along a shift axis oriented parallel to a cross conveyor carrying incoming glass containers in a row extending parallel to the shift axis, a stroke axis oriented parallel to a lehr conveyor carrying the containers away from the cross conveyor in a row extending transverse to the lehr conveyor movement, and a vertical lift axis, the improvement a motor for each of said axes operable to effect movement of the stacker bar along the corresponding axis;

a video screen;

means for displaying a graphic image of the stacker machine on said screen;

means for generating data representative of the desired motions of the stacker bar along each of said axes during one cycle of the stacker machine;

means for using said data to simulate on the screen said desired motions to verify their validity;

means for generating electrical pulses which correspond to the desired motions; and means for applying said pulses to the motors in a manner to effect movement of the stacker bar in conformity to said desired motions.

* * * * *